US010818190B2

(12) United States Patent
Calleja Alvarez et al.

(10) Patent No.: US 10,818,190 B2
(45) Date of Patent: Oct. 27, 2020

(54) SYSTEM AND METHOD FOR VEHICLE TRAVELLING IN CARAVAN MODE

(71) Applicant: Ford Global Technologies, LLC, Dearborn, MI (US)

(72) Inventors: Carlos Calleja Alvarez, Mexico City (MX); Ever Rafael Diaz Gutierrez, Nogales (MX); Enrique Isaac Davila Lopez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 15/865,646

(22) Filed: Jan. 9, 2018

(65) Prior Publication Data
US 2019/0213889 A1    Jul. 11, 2019

(51) Int. Cl.
| | |
|---|---|
| *G08G 1/00* | (2006.01) |
| *H04H 20/57* | (2008.01) |
| *G08G 1/123* | (2006.01) |
| *G08G 1/09* | (2006.01) |
| *H04W 4/029* | (2018.01) |
| *G08G 1/0968* | (2006.01) |
| *G01C 21/34* | (2006.01) |

(52) U.S. Cl.
CPC .............. *G08G 1/22* (2013.01); *G01C 21/34* (2013.01); *G08G 1/091* (2013.01); *G08G 1/096811* (2013.01); *G08G 1/096844* (2013.01); *G08G 1/123* (2013.01); *H04H 20/57* (2013.01); *H04W 4/029* (2018.02)

(58) Field of Classification Search
CPC .... G08G 1/22; G08G 1/091; G08G 1/096811; G08G 1/096844; G08G 1/123; H04W 4/029; H04W 20/57; G01C 21/34
See application file for complete search history.

(56) References Cited

U.S. PATENT DOCUMENTS

| | | | | |
|---|---|---|---|---|
| 8,352,111 | B2 * | 1/2013 | Mudalige | G08G 1/22 340/435 |
| 8,744,666 | B2 * | 6/2014 | Switkes | G05D 1/0295 701/28 |
| 8,855,900 | B2 * | 10/2014 | Lection | G08G 1/0145 340/907 |
| 9,605,968 | B2 | 3/2017 | Song et al. | |
| 10,017,039 | B1 * | 7/2018 | Colavincenzo | B60K 6/40 |
| 10,254,764 | B2 * | 4/2019 | Laubinger | B60W 30/165 |
| 10,481,614 | B2 * | 11/2019 | Switkes | G05D 1/0217 |
| 10,598,302 | B2 * | 3/2020 | Wheeler | F16L 3/127 |
| 2007/0168118 | A1 * | 7/2007 | Lappe | G01C 21/005 701/408 |
| 2012/0086582 | A1 * | 4/2012 | Durekovic | G08G 1/164 340/903 |
| 2014/0302774 | A1 | 10/2014 | Burke et al. | |
| 2014/0303870 | A1 * | 10/2014 | Switkes | G05D 1/0295 701/96 |

(Continued)

*Primary Examiner* — Angelina Shudy
(74) *Attorney, Agent, or Firm* — Brooks Kushman PC (57) ABSTRACT

A navigation system for a vehicle comprises a controller programmed to, responsive to data indicating separation of a follower vehicle from a caravan led by the vehicle and traveling along a predefined route to a destination, generate an alternative route for the follower vehicle to rejoin the caravan at a meetup location before the destination, and alter speed of the vehicle based on expected travel time of the follower vehicle along the alternative route.

18 Claims, 5 Drawing Sheets

(56) References Cited

U.S. PATENT DOCUMENTS

| | | | |
|---|---|---|---|
| 2014/0309806 A1* | 10/2014 | Ricci | G06Q 10/02 |
| | | | 701/1 |
| 2014/0316671 A1 | 10/2014 | Okamoto | |
| 2018/0211546 A1* | 7/2018 | Smartt | H04W 12/04 |
| 2018/0244275 A1* | 8/2018 | Bremkens | B60W 50/14 |
| 2019/0035284 A1* | 1/2019 | Tam | H04W 4/029 |
| 2020/0080853 A1* | 3/2020 | Tam | G08G 1/22 |
| 2020/0096340 A1* | 3/2020 | Jacotot | G01C 21/10 |

* cited by examiner

SYSTEM AND METHOD FOR VEHICLE TRAVELLING IN CARAVAN MODE

TECHNICAL FIELD

The present disclosure generally is related to vehicle caravan travelling. More particularly, the present disclosure is related to a system for multiple vehicles to travel as a group.

BACKGROUND

When multiple vehicles are traveling in caravan mode as a group, the group can be separated for various reasons. For instance, follower vehicles of the group may be stopped by a traffic light at an intersection while others have already passed the intersection; some vehicles take a wrong turn and have to turn back to rejoin the group. In these situations, it is difficult for the group organizer to control the group and many times a part of the group has to stop and wait for members fallen behind, resulting in increased effort and waste of time.

SUMMARY

In one or more illustrative examples, a navigation system for a vehicle comprises a controller programmed to, responsive to data indicating separation of a follower vehicle from a caravan led by the vehicle and traveling along a predefined route to a destination, generate an alternative route for the follower vehicle to rejoin the caravan at a meetup location before the destination, and alter speed of the vehicle based on expected travel time of the follower vehicle along the alternative route.

In one or more illustrative examples, a navigation system for a vehicle comprises a controller programmed to, responsive to separation of the vehicle from a caravan traveling along a predefined route to a destination, receive from a lead vehicle of the caravan an alternative route and suggested speed to rejoin the caravan at a meetup location before the destination, and operate the vehicle to follow the alternative route at the suggested speed.

In one or more illustrative examples, a vehicle terminal installed on a vehicle comprises a processor programmed to select to enter a lead mode or a follower mode, responsive to the lead mode being entered and data indicating separation of a follower vehicle from a caravan traveling along a predefined route to a destination, generate an alternative route for the follower vehicle to rejoin the caravan at a meetup location before the destination, and alter speed of the vehicle based on expected travel time of the follower vehicle along the alternative route, and responsive to the follower mode being entered and data indicating separation of the vehicle from the caravan, receive from a lead vehicle of the caravan an alternative route with suggested speed to rejoin the caravan at a meetup location before the destination, and operate the vehicle to follow the alternative route at the suggested speed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a caravan system. More specifically, the present disclosure proposes a navigation system for a group of vehicles to travel together in a caravan mode. The group of vehicles includes a lead vehicle providing navigation information and at least one follower vehicle using the navigation information from the lead vehicle.

Figure 1:
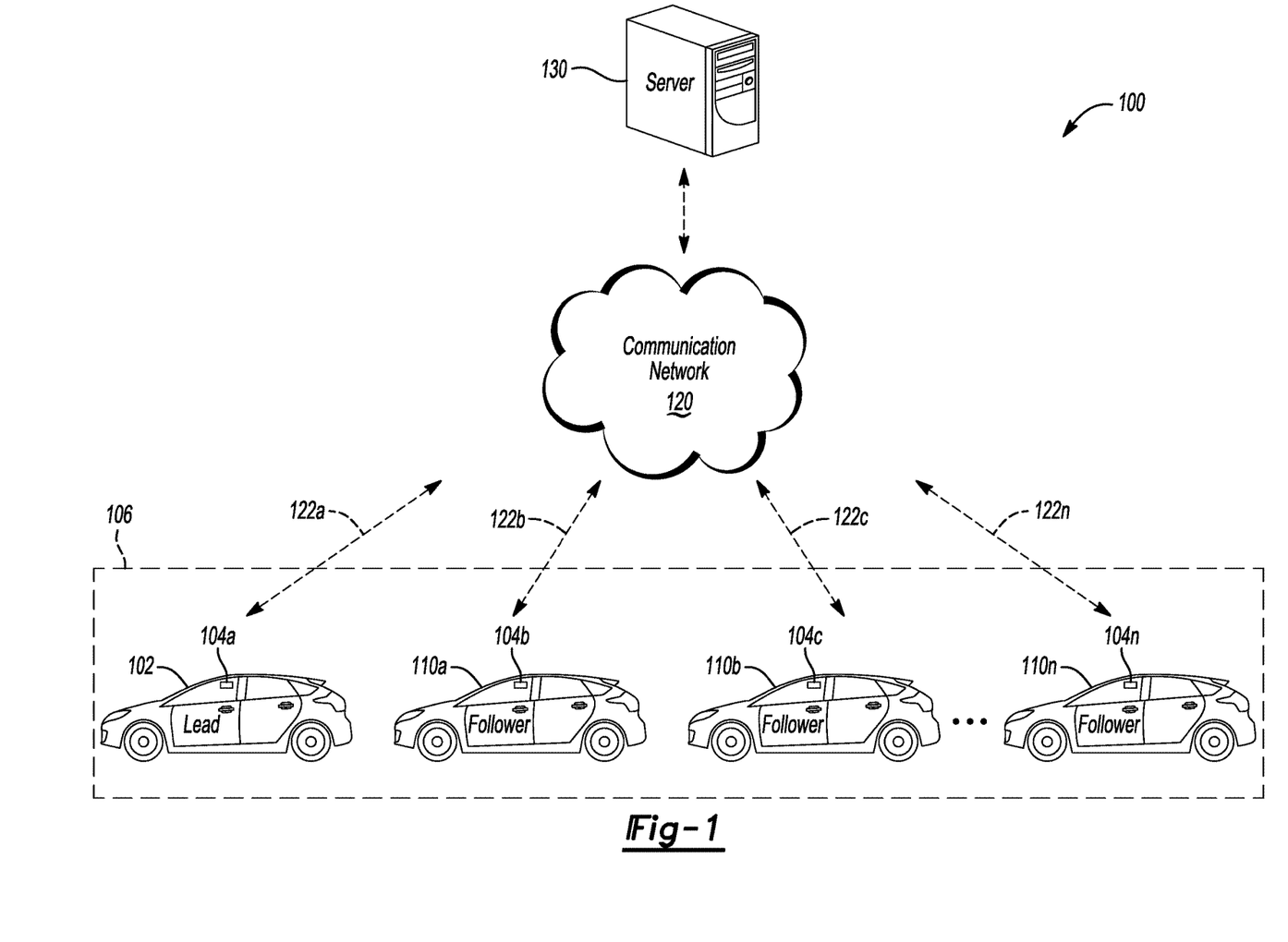
FIG. 1 illustrates an example schematic diagram of a caravan system of one embodiment of the present disclosure.

Referring to FIG. 1, an example schematic diagram of a caravan system 100 of one embodiment of the present disclosure is illustrated. A caravan 106 may include a lead vehicle 102 followed by a plurality of follower vehicles 110. The caravan 106 may include various types of automobile, crossover utility vehicle (CUV), sport utility vehicle (SUV), truck, recreational vehicle (RV), or other mobile machine for transporting people or goods. In many cases, vehicles in the caravan 106 may be powered by an internal combustion engine. As another possibility, vehicles may be a hybrid electric vehicle (HEV) powered by both an internal combustion engine and one or move electric motors, such as a series hybrid electric vehicle (SHEV), a parallel hybrid electric vehicle (PHEV), a parallel/series hybrid vehicle (PSHEV), or an electric vehicle (EV), or other mobile machine for transporting people or goods.

Each vehicle of the caravan 106 may communicate with a server 130 via a communication network 120 through wireless connections 122. For instance, the communication network 120 is a cellular network. In addition, each vehicle may include a vehicle computing system 104 configured to navigate the caravan 106. The vehicle computing systems 104 of the caravan 106 may be configured to share and exchange location data from each other using the server 130 via the communication network 120. The vehicle computing system 104*a* installed on a lead vehicle 102 may be configured to coordinate the caravan 106 by creating a navigation route and sending the route to each vehicle of the caravan via the server 130. The vehicle computing system 104*b-n* installed on the follower vehicles 110 may be configured to receive the navigation route from the lead vehicle 102. In this way, every vehicle in the caravan 106 has the same navigation route to execute.

Ideally, the caravan 106 travels as a group and no vehicle is separated. However, that is not the case in real life. In order to keep the caravan 106 as a group, the vehicle computing system 104*a* installed on the lead vehicle 102 may be configured to set a fall behind threshold within which the caravan 106 is deemed as a group. When every vehicle of the caravan 106 is within the fall behind threshold, the vehicle computing system 104*a* may determine the caravan 106 is travelling together as a group. However, when one or more follower vehicles 110 have fallen behind beyond the threshold, the vehicle computing system 104*a* may determine the caravan 106 is broken apart and takes action. As an example, the fall behind threshold may be the maximum distance that a follower vehicle 110 is allowed to be away from the lead vehicle 102. Alternatively, the fall behind threshold may be a time period within which a follower vehicle 110 must reach a checkpoint location that the lead vehicle 102 has previously reached.

When a follower vehicle 110 is separated from the caravan beyond the fall behind threshold, the vehicle computing system 104*a* of the lead vehicle 102 may provide the separated follower vehicle 110 with navigation instructions, such as adjusting the speed and/or a recalculated route to facilitate the reunion of the caravan. Additionally, the vehicle computing system 104*a* of the lead vehicle 102 may provide instructions to the rest of the caravan 106 including lead vehicle 102 itself to take actions, such as adjust the speed, to facilitate reunion of the caravan 106. As an example, the vehicle computing system 104 may include the SYNC system manufactured by The Ford Motor Company of Dearborn, Mich.

Figure 2:
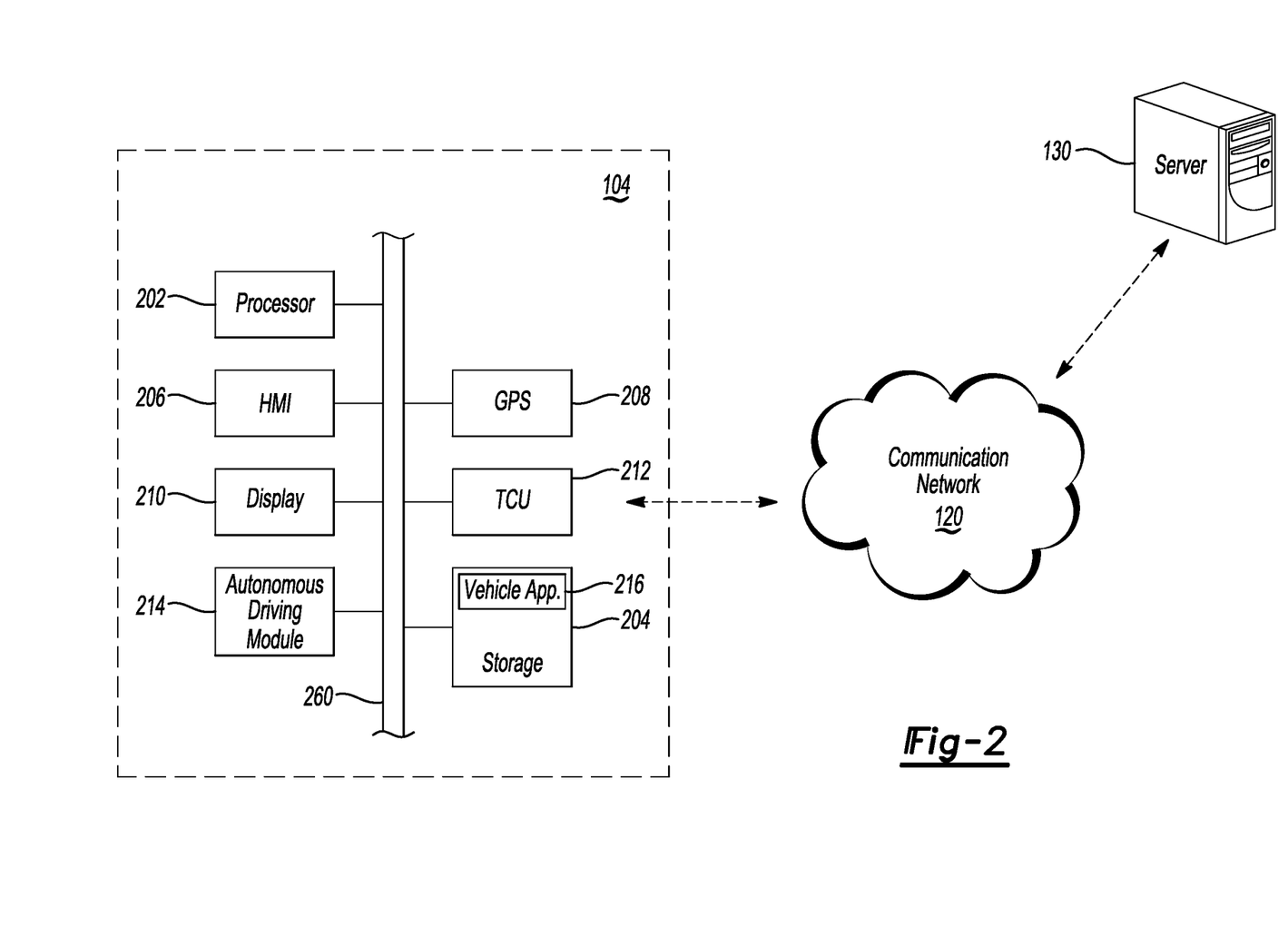
FIG. 2 illustrates an example block diagram of a vehicle computing system of one embodiment of the present disclosure.

Referring to FIG. 2, an example block diagram of a vehicle computing system 104 of one embodiment of the present disclosure is illustrated. The vehicle computing system 104 may include various components, modules and/or parts configured to communicate with each other via one or more in-vehicle networks 260. The in-vehicle network 260 may include, but is not limited to, one or more of a controller area network (CAN), an Ethernet network, and a media oriented system transport (MOST), as some examples.

The vehicle computing system 104 may include one or more processors 202 configured to perform instructions, commands, and other routines in support of the processes described herein. For instance, the vehicle computing system 104 may be configured to execute instruction of vehicle application 216 to provide navigation functions. Such instructions and other data (e.g. map data) may be maintained in a non-volatile manner using a variety of types of computer-readable storage medium 204. The computer-readable medium 204 (also referred to as a processor-readable medium or storage) includes any non-transitory medium (e.g., tangible medium) that participates in providing instructions or other data that may be read by the processor 202. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The vehicle computing system 104 may be provided with various features allowing the vehicle occupants/users to interface with the vehicle computing system 104. For instance, the vehicle computing system 104 may receive input from human-machine interface (HMI) controls 206 configured to provide for occupant interaction with the vehicle. As an example, the vehicle computing system 104 may interface with one or more buttons (not shown) or other HMI controls configured to invoke functions on the vehicle computing system 104 (e.g., steering wheel audio buttons, a push-to-talk button, instrument panel controls, etc.). The vehicle computing system 104 may also drive or otherwise communicate with one or more display 210 configured to provide visual output to vehicle occupants. In some cases, the display 210 may be a touch screen further configured to receive user touch input, while in other cases the display 210 may be a display only, without touch input capabilities.

The vehicle computing system 104 may be provided with network connectivity via a telematics control unit (TCU) 212. The TCU may include a wireless modem (not shown) configured to connect the vehicle computing system 104 with the communication network 120 so as to communicate with the server 130. As an example, the vehicle computing system 104 may include a GPS module 208 configured to communicate with multiple GPS satellites to obtain the location of the vehicle and output a location data. The vehicle computing system 104 may be configured to send the location data from the GPS module to the server 130 via the TCU 212 so as to allow other vehicles of the caravan 106 to know the location of its own vehicle. The TCU 212 may be further configured to receive live traffic data from the server 130 for better route planning. It is noted that the computing system 104 may be configured to plan the navigation route with or without the live traffic data . . . .

In addition, the vehicle computing system 104 may be further provided with an autonomous driving module 214 configured to perform autonomous driving of the vehicle using the location data and navigation route. The autonomous driving module 214 may be connected to various other components (not shown), such as, sensors, accelerator, and brake, to perform the autonomous driving and control.

The vehicle computing system 104 may be configured to select/enter into a caravan mode to perform the caravan discussed above. In addition, the vehicle computing system 104 may be configured to enter into either a lead mode for the lead vehicle, or a follower mode for the follower vehicle. In the lead mode, the vehicle computing system 104 may be configured to create the caravan 106 and send navigation to the follower vehicles 110. In the follower mode, the vehicle computing system 104 may be configured to join the caravan 106 that is created by the lead vehicle 102 and receive navigation instructions sent from the lead vehicle 102.

Figure 3:
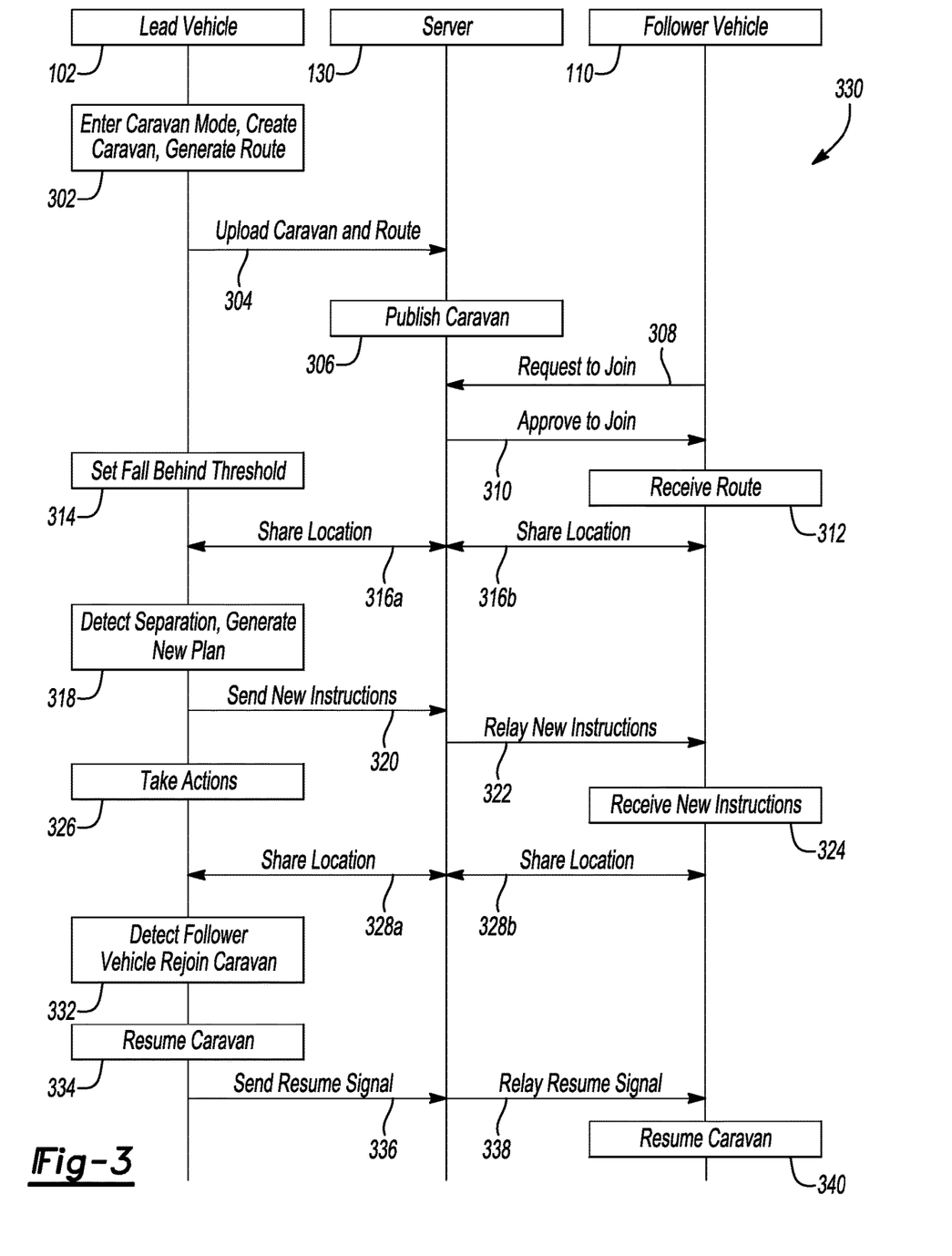
FIG. 3 illustrates an example flow diagram of the caravan system of one embodiment of the present disclosure.

Referring to FIG. 3, an example flow diagram of a process 300 for the caravan system 100 is illustrated. At operation 302, the vehicle computing system 104a of the lead vehicle 102 (collectively "the lead vehicle 102") enters into the caravan mode by creating a caravan 106 and generating a navigation route. Here, the caravan 106 has only one member which is the lead vehicle 102 and it is open for other vehicles to join as follower members. At operation 304, the lead vehicle 102 uploads the caravan 106 and the navigation route to the server 130 via the communication network 120 to allow other vehicles to join the caravan 106. At operation 306, the server 130 receives the navigation route and caravan 106 from the lead vehicle 102, and publishes the route and caravan 106 so that other vehicles may see them. Alternatively, the server 130 may be configured to only publish the caravan by name or other identifications without making the information of the navigation route public for privacy concerns. Alternatively, the server 130 may be further configured to make the caravan information available to a specific group of vehicles, such as vehicles within a certain distance from the lead vehicle 102, or a group that is specified by the lead vehicle 102. Alternatively, the server 130 may be a non-public server for military/government purposes and only users with authorized credentials may connect to the server 130.

At operation 308, responsive to the publication of the caravan 106, a follower vehicle 110 may request to join the caravan 106 by sending a request to join to the server 130. The server 130 may approve the request to join responsive to a correct credential verification, such as a password. As an example, the credential may be generated by the lead vehicle 102 and uploaded to the server 130 along with the caravan 106 at operation 304. Alternatively, the server 130 may be configured to transfer the request to join to the lead vehicle 102 and let the lead vehicle 102 to decide whether to approve or decline each individual request. In response to the receipt of the approval to join at operation 310, the follower vehicle 110 may receive and store the navigation route from the server at operation 312. The follower vehicle 110 illustrated in FIG. 3 is merely an example and more than one follower vehicle may join the caravan.

At operation 314, the lead vehicle 102 may set a fall behind threshold for the caravan 106. As discussed above, the fall behind threshold may be used to determine whether the caravan 106 is travelling together. The fall behind threshold may be a distance and/or a time. As an example, the user of the lead vehicle 102 may manually set the fall behind threshold according to his/her experience or preference. Alternatively, the fall behind threshold may be set by the vehicle computing system 104a of the lead vehicle 102 responsive to information including the number of follower vehicles, traffic of the navigation route, weather condition, road condition, etc. For instance, the lead vehicle 102 may set a default fall behind threshold of 50 yards for a caravan having only one follower vehicle, and increase the threshold by 50 yards with each additional follower vehicle joining the caravan. As another example, the lead vehicle 102 may set the default fall behind threshold to be 30 yards with no time limit for each follower vehicle in the city, and 100 yards with a 15-second time limit threshold for each follower vehicle in the countryside where traffic condition is better than in the city. The fall behind threshold may be adjusted during the execution of the route according to the change of circumstances (e.g. road condition, traffic, etc.). The occupant of the lead vehicle 102 may manually adjust the fall behind threshold.

At operation 316, responsive to the follower vehicle 110 joining the caravan 106, each member of the caravan including the lead vehicle 102 and the follower vehicle 110 may share location information of its own vehicle with other members of the caravan 106 by uploading the location information to the server 130 accessible by other members of the caravan 106. As an example, each vehicle of the caravan 106 may continue to share its location in a real-time manner so each vehicle knows the real-time locations of other vehicles.

At operation 318, the lead vehicle 102 detects the follower vehicle 110 is separated from the caravan 106 by determining it is beyond the fall behind threshold set at operation 314 using the real-time location data sent from the follower vehicle 110. Responsive to the detection of separation, the lead vehicle 102 may generate a reunion plan to facilitate reunion of the follower vehicle 110 with the caravan 106. As a part of the reunion plan, the lead vehicle 102 may generate new instructions for the follower vehicle 110. At operations 320 and 322, the lead vehicle 102 may send the new instructions to the follower vehicle 110 via the server 130. At operation 324, responsive to the new instructions received from the lead vehicle 102, the follower vehicle 110 may suspend the original navigation route and implement the new instructions. As an example, the new instruction may include, increase the speed, take another route and rejoin the caravan 106 at a meetup point, etc.

In addition to the new instructions sent to the follower vehicle 110, the reunion plan may also require the lead vehicle 102 to take actions to facilitate the reunion. For instance, the actions that the lead vehicle 102 may take include slow down, pull over and wait, etc. The same idea may also apply to the case in which there are multiple follower vehicles in the caravan 106 and only some of the follower vehicles fall behind. In this situation, the caravan 106 is separated into two groups, the group ahead and the group fallen behind. The group ahead which includes the lead vehicle 102 are vehicles that are ahead and on the original navigation route. The group fallen behind are follower vehicles that are separated from the group ahead. In this case, the lead vehicle 102 may generate the union plan and provide instructions collectively by groups to coordinate the reunion.

At operation 328, the lead vehicle 102 and the follower vehicle 110 continues to share their location data with the caravan 106. Using the real-time location information sent from each vehicle, the lead vehicle 102 may check whether the follower vehicle 110 has rejoined the caravan 106. At operation 332, the lead vehicle 102 detects the follower vehicle 110 has reunited with the caravan 106. At operation 334, the lead vehicle 102 may resume the caravan and send a resume signal to the follower vehicle 110 via the server 130 at operations 336 and 338. Responsive to the resume signal from the lead vehicle 102, the follower vehicle 110 may resume the original route previously suspended and continue to be a part of the caravan 106.

Figure 4A:
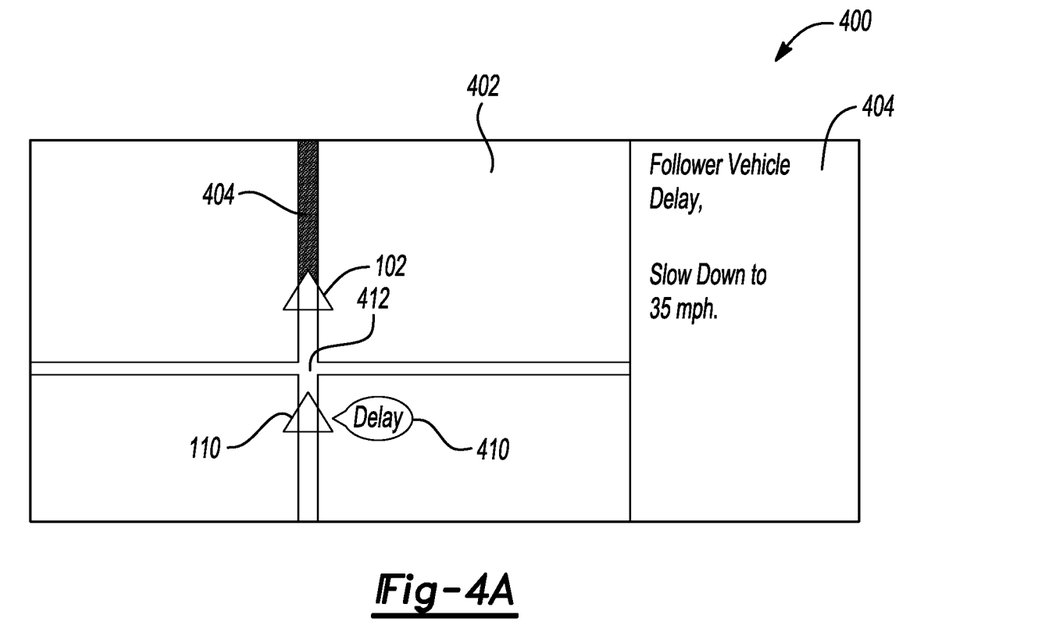
FIG. 4A illustrates an example navigation screen of the lead vehicle of one embodiment of the present disclosure.
Figure 4B:
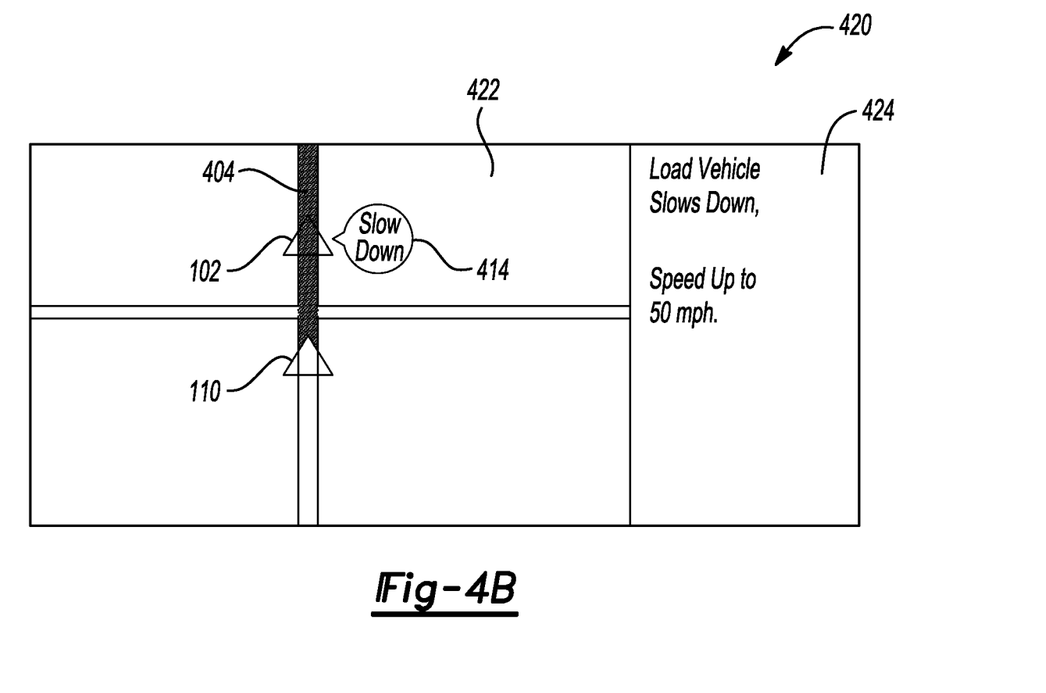
FIG. 4B illustrates an example navigation screen of the follower vehicle of one embodiment of the present disclosure.

Referring to FIGS. 4A and 4B, an example navigation screen 400 of the lead vehicle 102 and an example navigation screen 420 of the follower vehicle 110 of one embodiment of the present disclosure are illustrated. Referring to FIG. 4A, as an example, the navigation screen 400 may be displayed on the display 210 of the vehicle computing system 104. The navigation screen 400 may be divided into two sections. A map section 402 may be displayed on the left side of the screen 400 to provide map information, and an instruction section 404 may be displayed on the right side of the screen 400 to provide instructions.

A navigation example in which the follower vehicle 110 is separated from the caravan is illustrated in FIGS. 4A and 4B. In this example, the lead vehicle 102 and the follower vehicle 110 only need to adjust the speed to facilitate the reunion and no new route is planned. Referring to FIG. 4A, the lead vehicle 102 is indicated using a triangle icon at the center of the map. A shaded area 404 indicates the navigation route that is being executed. As illustrated, while the lead vehicle 102 is travelling as planned on the route 404, the follower vehicle 110 is stopped at an intersection 412 and therefore separated from the caravan 106. Responsive to the detection of the separation of the follower vehicle 110, navigation screen 400 may indicate the delay status of the follower vehicle 110 in a bubble 410 displayed next to the triangle icon indicative of the follower vehicle 110. In addition, instructions may be displayed on the instruction section 404 of the navigation screen 400. For instance, the instruction for the lead vehicle 102 is "Follower vehicle delay. Slow down to 35 mph." In this example, 35 mph may be the minimum speed limit that vehicles are allowed to travel on the route 404. At approximately the same time, referring to FIG. 4B, the navigation screen 420 of the follower vehicle 110 may display a slowdown status in a bubble 414 next to the triangle icon representative of the lead vehicle 102 in the map section 422 to indicate the status of the lead vehicle 102. In addition, an instruction for the follower vehicle 110 may be displayed on the instruction section 424. In this example, the instruction is "Lead vehicle slows down. Speed up to 50 mph." For instance, 50 mph may be the maximum speed limit that vehicles may drive on the navigation route 404. Since the suggested speed for the follower vehicle 110 is faster than the suggested speed for the lead vehicle 102, it will catch up with the lead vehicle 102 and rejoin the caravan 106.

Figure 5A:
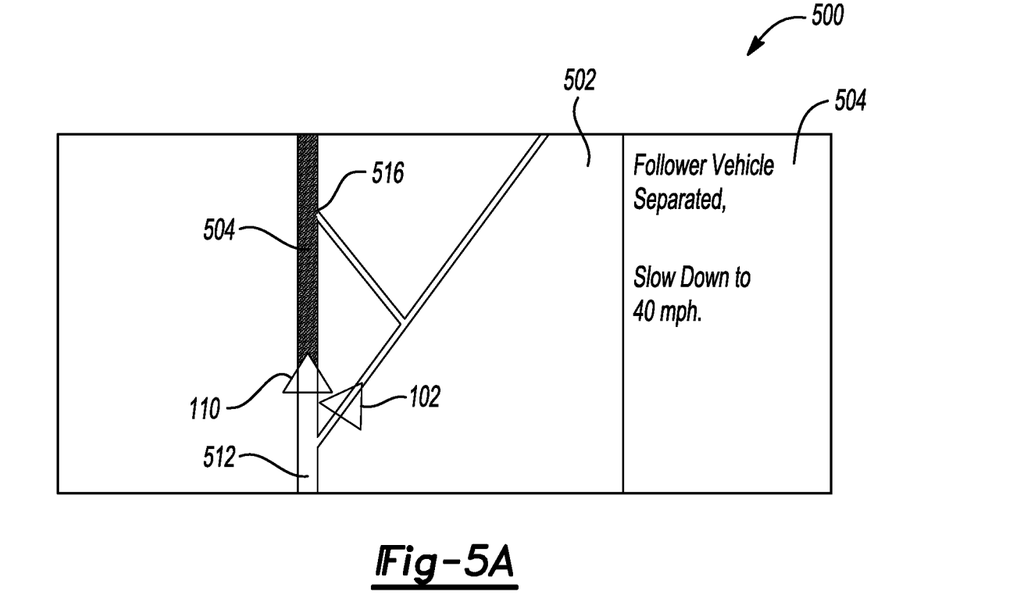
FIG. 5A illustrates an example navigation screen of the lead vehicle of another embodiment of the present disclosure.
Figure 5B:
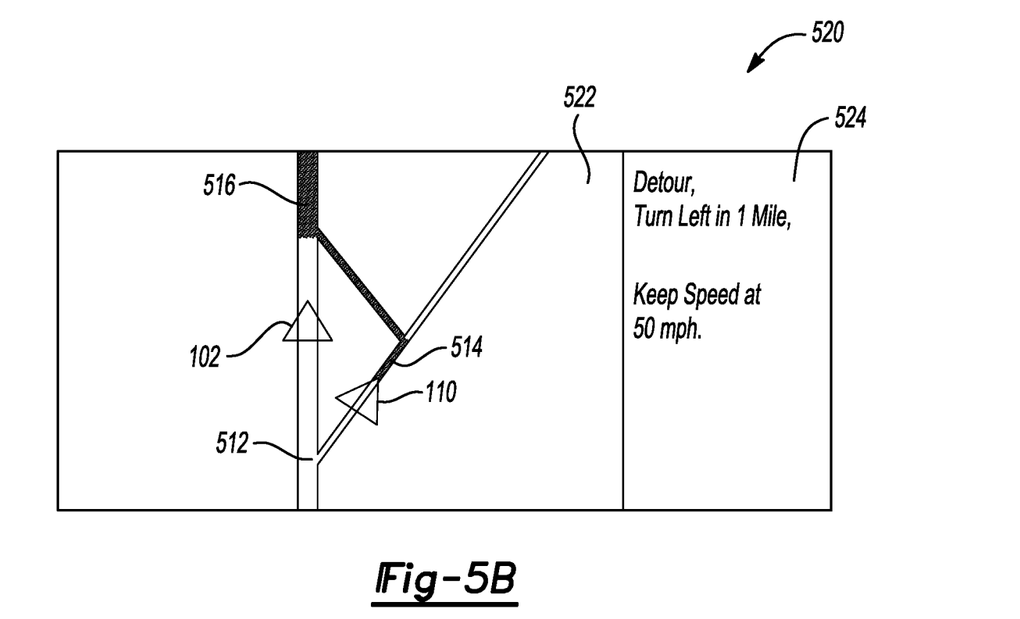
FIG. 5B illustrates an example navigation screen of the follower vehicle of another embodiment of the present disclosure.

Referring to FIGS. 5A and 5B, an example navigation screen 500 of the lead vehicle 102 and an example navigation screen 520 of the follower vehicle 110 of another embodiment of the present disclosure are illustrated. Compared to the embodiment illustrated in FIGS. 4A and 4B, the current example requires planning a new route for the follower vehicle 110 for the reunion of the caravan 106. While the lead vehicle 102 is travelling as planned on the navigation route 504, the follower vehicle 110 took a wrong turn at an intersection 512 and drove off the navigation route. The vehicle computing system 104 of the lead vehicle 102 may recalculate a new route 514 for the follower vehicle 110 to allow it to rejoin the caravan 106 at around an intersection 516. Since the new route 514 is longer in distance and will take more time to take, the vehicle computing system 104 may instruct the lead vehicle 102 to slowdown so that both the lead vehicle 102 and the follower vehicle 110 will arrive at the intersection 516 at approximately the same time to reunite. For the lead vehicle 102, referring to FIG. 5A, the instruction may be "Follower vehicle separated. Slowdown to 40 mph." For the follower vehicle 110, referring to FIG. 4B, the instruction may be "Detour. Turn left in 1 mile. Keep speed at 50 mph." The suggested speed for both the lead vehicle 102 and the follower vehicle 110 may be calculated to allow both vehicles to arrive at the intersection 516 at substantially the same time to reunite. In addition, the maximum and minimum speed limit of the routes are also taken into account.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A navigation system for a vehicle, comprising:
a controller programmed to, responsive to data indicating separation of a follower vehicle from a caravan led by the vehicle and traveling along a predefined route to a destination, generate an alternative route for the follower vehicle to rejoin the caravan at a meetup location before the destination, and alter speed of the vehicle based on expected travel time of the follower vehicle along the alternative route.

2. The navigation system of claim 1, wherein the controller is further programmed to set a fall behind threshold defining conditions for the separation.

3. The navigation system of claim 2, wherein the fall behind threshold is a distance from the vehicle.

4. The navigation system of claim 2, wherein the fall behind threshold is a time period within which the follower vehicle is to reach a location that has previously been reached by the vehicle.

5. The navigation system of claim 2, wherein the controller is further programmed to modify the fall behind threshold responsive to user input.

6. The navigation system of claim 2, wherein the controller is further programmed to modify the fall behind threshold responsive to a change of road condition.

7. The navigation system of claim 2, wherein the controller is further programmed to modify the fall behind threshold responsive to a change of traffic condition.

8. The navigation system of claim 1, wherein the vehicle and the follower vehicle communicate through a server via a wireless network.

9. The navigation system of claim 1, wherein the controller is further programmed to send vehicle location data to the follower vehicle, and receive location data from the follower vehicle.

10. The navigation system of claim 1, wherein the controller is further programmed to adjust the speed of the vehicle based on a speed limit of a road that the vehicle is travelling on.

11. A navigation system for a vehicle, comprising:
a controller programmed to, responsive to separation of the vehicle from a caravan traveling along a predefined route to a destination, receive from a lead vehicle of the caravan an alternative route and suggested speed to rejoin the caravan at a meetup location before the destination, and operate the vehicle to follow the alternative route at the suggested speed.

12. The navigation system of claim 11, wherein the controller is further programmed to send location data to the lead vehicle, and receive location data from the lead vehicle.

13. The navigation system of claim 12, wherein the caravan includes a plurality of follower vehicles, and the controller is further programmed to send location data to the follower vehicles, and to receive location data from the follower vehicles.

14. A vehicle terminal installed on a vehicle, comprising:
a processor programmed to:
select to enter a lead mode or a follower mode,
responsive to the lead mode being entered and data indicating separation of a follower vehicle from a caravan traveling along a predefined route to a destination, generate an alternative route for the follower vehicle to rejoin the caravan at a meetup location before the destination, and alter speed of the vehicle based on expected travel time of the follower vehicle along the alternative route, and
responsive to the follower mode being entered and data indicating separation of the vehicle from the caravan, receive from a lead vehicle of the caravan an alternative route with suggested speed to rejoin the caravan at a meetup location before the destination, and operate the vehicle to follow the alternative route at the suggested speed.

15. The vehicle terminal of claim 14, wherein the vehicle terminal is connected to a wireless network via a telematics controller, to communicate with a server.

16. The vehicle terminal of claim 14, wherein the processor is further programmed to set a fall behind threshold defining criteria for the separation.

17. The vehicle terminal of claim 16, wherein the fall behind threshold is a distance.

18. The vehicle terminal of claim 16, wherein the fall behind threshold is a time period.

* * * * *